United States Patent [19]

Finzel et al.

[11] Patent Number: 5,187,766
[45] Date of Patent: Feb. 16, 1993

[54] OPTICAL FIBER WAVEGUIDE DIVISION RACK FOR HOLDING PLURAL CASSETTES

[75] Inventors: Lothar Finzel, Unterschleissheim; Thomas Ruckgaber, Munich, both of Fed. Rep. of Germany

[73] Assignee: Siemens Aktiengesellschaft, Munich, Fed. Rep. of Germany

[21] Appl. No.: 834,204

[22] Filed: Feb. 12, 1992

[30] Foreign Application Priority Data

Feb. 27, 1991 [DE] Fed. Rep. of Germany ....... 4106170

[51] Int. Cl.$^5$ .............................. G02B 6/26; B65D 1/34
[52] U.S. Cl. ...................................... 385/135; 385/136; 385/137; 206/316.1; 206/557; 206/558; 206/565
[58] Field of Search ............... 385/135, 136, 137, 138; 206/316.1, 472, 473, 557, 558, 560, 564, 565

[56] References Cited

U.S. PATENT DOCUMENTS

| | | | |
|---|---|---|---|
| 4,752,110 | 6/1988 | Blanchet et al. | 385/135 |
| 4,770,357 | 9/1988 | Sander et al. | 385/135 X |
| 4,812,004 | 3/1989 | Biederstedt et al. | 385/135 |
| 4,927,227 | 5/1990 | Bensel, III et al. | 385/135 |
| 4,971,421 | 11/1990 | Ori | 385/135 |
| 5,071,220 | 12/1991 | Ruello et al. | 385/135 |
| 5,080,459 | 1/1992 | Wettengel et al. | 385/135 |
| 5,093,887 | 3/1992 | Witte | 385/135 |
| 5,129,030 | 7/1992 | Petrunia | 385/135 |
| 5,131,066 | 7/1992 | Foss | 385/135 |
| 5,133,038 | 7/1992 | Zipper | 385/135 |
| 5,138,688 | 8/1992 | Debortoli | 385/135 |
| 5,138,689 | 8/1992 | Merlo et al. | 385/135 |

FOREIGN PATENT DOCUMENTS

| | | | |
|---|---|---|---|
| 3542724 | 6/1987 | Fed. Rep. of Germany | 385/135 X |
| 3540472 | 5/1989 | Fed. Rep. of Germany | 385/135 X |

Primary Examiner—Brian Healy
Attorney, Agent, or Firm—Hill, Steadman & Simpson

[57] ABSTRACT

A division rack comprises one or more distributor housings, with each distributor housing having a cassette holder mounted for pivotable movement between a first position received in the housing and a second position extending horizontally out of the housing. Each cassette holder comprises a channel-shaped member having a plurality of guide webs forming compartments for receiving cassettes or cassette blocks, which guide webs extend obliquely relative to the axis of the holder so that the cassettes are stored in an oblique position when the holder is in its first, vertical position. The incoming cables to each of the cassettes are clamped in the housing and extend over an upper end of each of the holders to the individual cassettes or cassette blocks.

15 Claims, 3 Drawing Sheets

OPTICAL FIBER WAVEGUIDE DIVISION RACK FOR HOLDING PLURAL CASSETTES

BACKGROUND OF THE INVENTION

The present invention is directed to a light guide division rack comprising at least one cassette holder which can be tilted out of the rack.

As in previous cable systems, end racks or distributors are provided in the light waveguide system. Splice elements, which are arranged in cassettes, are employed for joining optical fibers. The cassettes also serve the purpose of accepting what is referred to as "reserve lengths" of the optical fibers. Some of the other types of cassettes will contain coupling elements with which a branch into a plurality of light waveguides can be undertaken. The cassettes are arranged in racks, wherein every cassette must be individually accessible in order to be able to implement either repair work or forming connections between fibers.

U.S. Pat. No. 4,770,357, whose disclosure is incorporated herein by reference thereto, and German Patent 35 40 472 both disclose an apparatus for storing cassettes. The individual cassettes are arranged individually, pivotably and can be pivoted from a vertical storage position into a horizontal removable position with a push-tilt mechanism. This apparatus seems less suitable for larger racks.

German Published Application 35 42 724 discloses a terminating fitting for an optical cable that serves the purpose of accepting a plurality of cassette blocks. These cassette blocks can always be brought via pivot arms into a normal working height, wherein repair and/or forming of connections by jumping are easily possible. A disadvantage of these devices are the low packing densities for the cassettes.

SUMMARY OF THE INVENTION

It is an object of the present invention to provide a light waveguide division rack that, given a low space requirement, can accept a great plurality of cassette blocks and enables a good accessibility to all the cassettes.

This object is achieved in a light waveguide division rack having a cassette holder being mounted for pivotable movement around a rotational axis adjacent one end of the holder from a first position completely received within the rack to a second position extending out of the rack, said cassette holder having a plurality of holding devices for receiving cassette blocks, each of said holding devices being constructed with the sides of a cassette block comprising the terminal leads being held obliquely up while in a vertical storage with the cassette holder in the first position.

The good accessibility of the individual cassettes is advantageous. The cassette holder can be tilted forward from the first position to the horizontal second position. The cassette blocks can then be individually removed from the holder.

It is thereby expedient when each of the holding devices of the cassette holder are shaped as deposit compartments, with each receiving a cassette block. The cassette block is held by a resilient element and by the force of gravity.

Preferably, each of the cassette holders is formed by a U-shaped channel member, whose lateral parts will serve as lateral guidance for each of the cassette blocks. In addition, these lateral guidance enhance the mechanical stability of the cassette holder.

Guide webs arranged at a lateral part of the U-shaped profile or channel are adequate for guiding the cassette blocks. Space for screw-type connections of the individual cassettes to form a cassette block is also provided.

It is advantageous when the cassettes are inserted into the cassette holder with their end faces, wherein the opposite end face with the connecting cables project obliquely upward. The oblique arrangement of the cassette blocks enables a favorable guidance of the connecting cables across the upper edge of the cassette holder in a large loop to cable clamps. Whether horizontal or vertical mounting of the cassettes is more beneficial is dependent on the dimensions of the division rack.

Other advantages and features of the invention will be readily apparent from the following description of the preferred embodiments, the drawings and claims.

DESCRIPTION OF THE PREFERRED EMBODIMENTS

The principles of the present invention are particularly useful when incorporated in a division rack 1 for light waveguides. The division rack 1 contains three distributor inserts 2. Each distributor insert is composed of a distributor housing 4 and of a cassette holder 3, which is mounted for pivotable movement from a vertical position illustrated in FIG. 2 and the cassette holder 3 on the right-hand side of FIG. 1, to a second, horizontal position illustrated by the cassette holder in FIG. 3 and the holder 3' of FIG. 1. A standard distributor rack can be employed as the light waveguide distributor rack. An arrangement of the distributor inserts disposed above one another is also possible.

Figure 1:
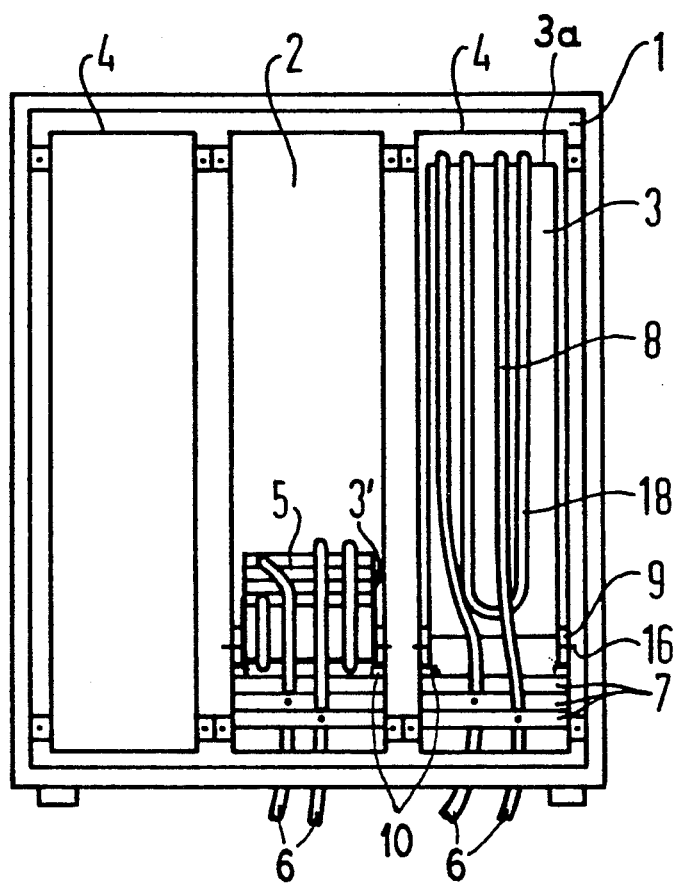
FIG. 1 is a front view of a division rack for light waveguides.
Figure 2:
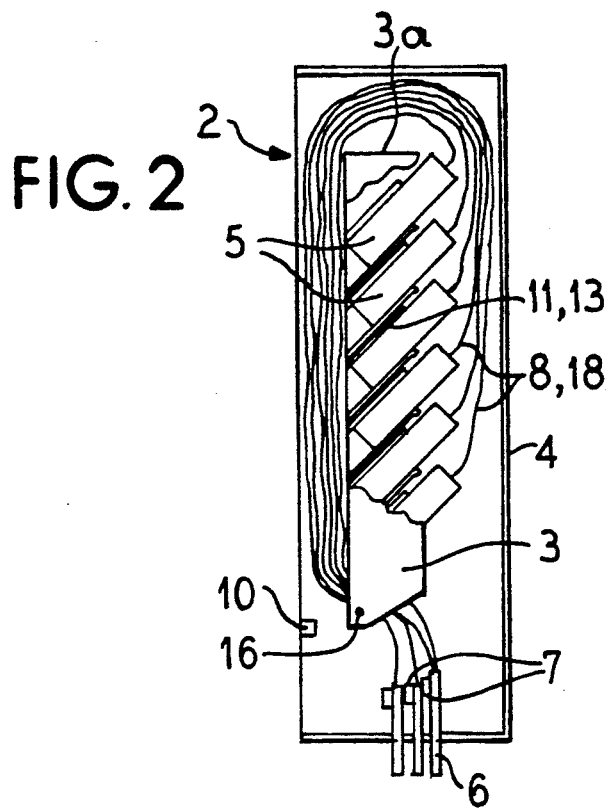
FIG. 2 is a side view of a cassette holder in a vertical position with portions broken away for purposes of illustration.
Figure 3:
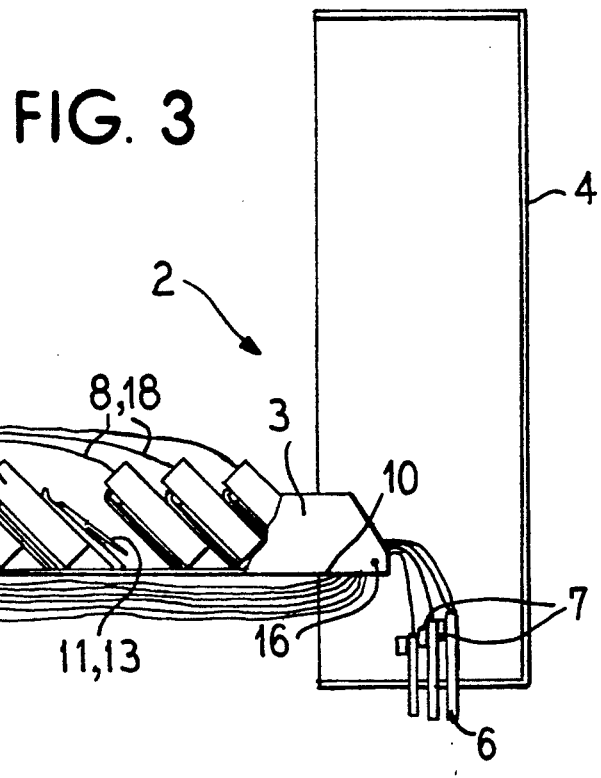
FIG. 3 is a side view of a cassette holder in a horizontal position with portions broken away for purposes of illustration.

Only two of the distributor inserts 2 are equipped with cassette holders 3 and 3' in FIG. 1. The middle cassette holder 3' is tilted forward so that the cassette blocks 5 become visible. Connecting cables 6, which are secured to cable clamps 7 provided in the distributor housing 4, have connecting leads 8 which contain one or more light waveguides and are conducted over an upper edge or end 3a of the cassette holder to the individual cassettes. Connecting leads 18, which extend between the cassettes in the cassette holder, are, likewise, laid in a long loop extending over the upper end 3a of the holder. Each of the individual cassette blocks can, thus, be easily removed and also has the additional lead length in order to easily implement the mounting or repair work on it as an individual cassette. The cassette holder 3 is prevented from being unintentionally tilted down by a frictional disc 9, which extends between the holder 3 and the distributor housing 4 adjacent a pivot axis or rotational axis 16. As illustrated in FIGS. 2 and 3, end stops 10 are provided to limit the pivotable movement of the cassette holder 3 and to define the second horizontal position.

As illustrated in FIG. 2, the cassette holder 3 is in a first, vertical position and has part of the U-shaped channel wall removed to allow viewing the interior of the holder. Each of the cassette holders comprise a plurality of holding devices or means which are fashioned by guide webs 11 or 13 and plates 20 that run obliquely and proceed from a front side of each cassette holder. The cassette blocks 5 are inserted into the deposit compartments formed in this way. As a result of the oblique arrangement, the cassette holder 3 and, thus, the distributor insert 2, as well, has only a slight depth. The guidance of the terminal leads 8 extend from the cable clamps 7, which are arranged in graduated steps in both height and depth in the housing 4, over an upper end 3a of the cassette holder 3. In addition, the interconnecting cables 18 are looped to extend over the end 3a. In this exemplary embodiment, six cassette blocks, each having four cassettes, are accepted in the cassette holders. In another embodiment, the individual cassettes can also be vertically arranged. Thus, narrower and deeper distributor inserts occur as a result. The cassette holder can be provided with a cover plate (not shown) so that the terminal and connecting leads are covered.

When the cassette holder 3 is tilted out in a forward direction to the second position illustrated in FIG. 3, the cassette block 5 can be removed in order to carry out repair work or connecting work on it. As a result of the guidance of the terminal leads 8, the cassette blocks 5 can be easily removed and manipulated.

Figure 4:
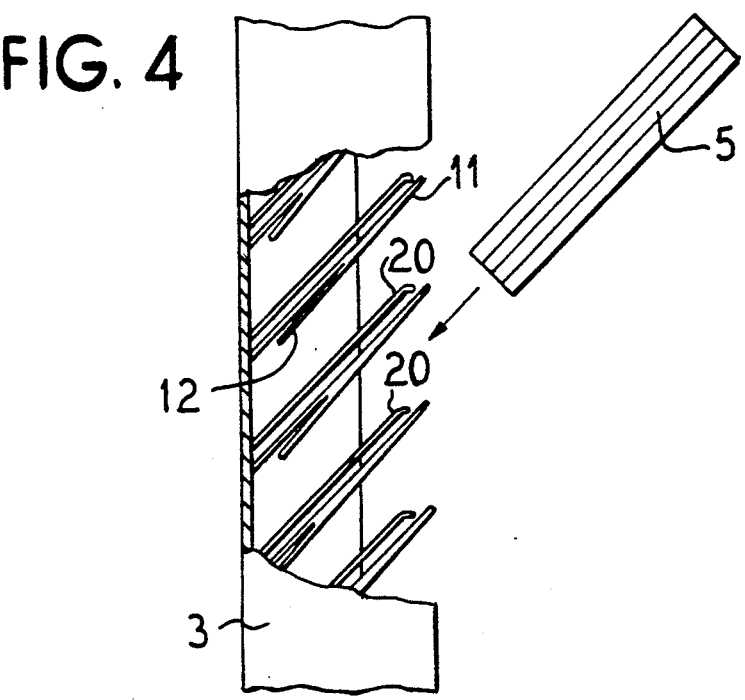
FIG. 4 is an enlarged side view with portions broken away illustrating details of the cassette holder.
Figure 5:
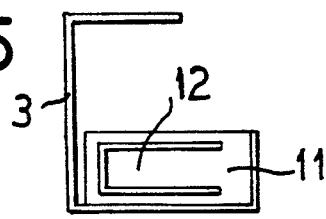
FIG. 5 is a plan view of the cassette holder of FIG. 4.

As illustrated in FIGS. 4 and 5, the guide webs 11 and plate 20 form a holding device for the cassette block 5. The guide web 11 has a resilient element 12, which is struck from the sheet or plate forming the guide web. This resilient element 12 will clamp the blocks 5 against the adjacent web or plate 20 when it is inserted into the holding device.

As best illustrated in FIG. 5, the guide web 11 and the plate 20 only cover a portion of the width of the cassette holder. As a result thereof, the cassette block can have screw elements that project into a free space next to the guide web 11.

Figure 6:
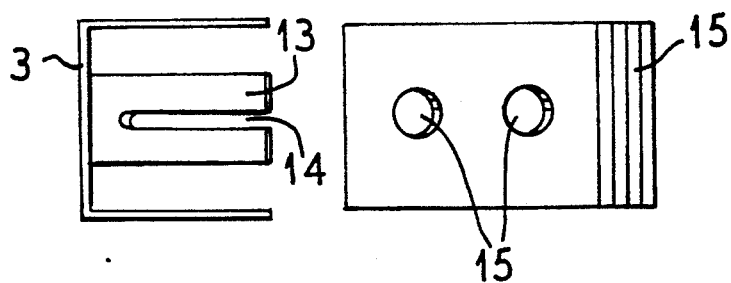
FIG. 6 is a plan view of a modification of the cassette holder.

A modification of the holding means is illustrated in FIG. 6 and has a guide web 13 which extends substantially at the same angle and has a slot 14 which is arranged to receive fastening elements 15 of the cassette blocks. These fastening elements 15 can be knurled screws with which the individual cassettes can also be joined to form a block using a threaded bolt.

Figure 7:
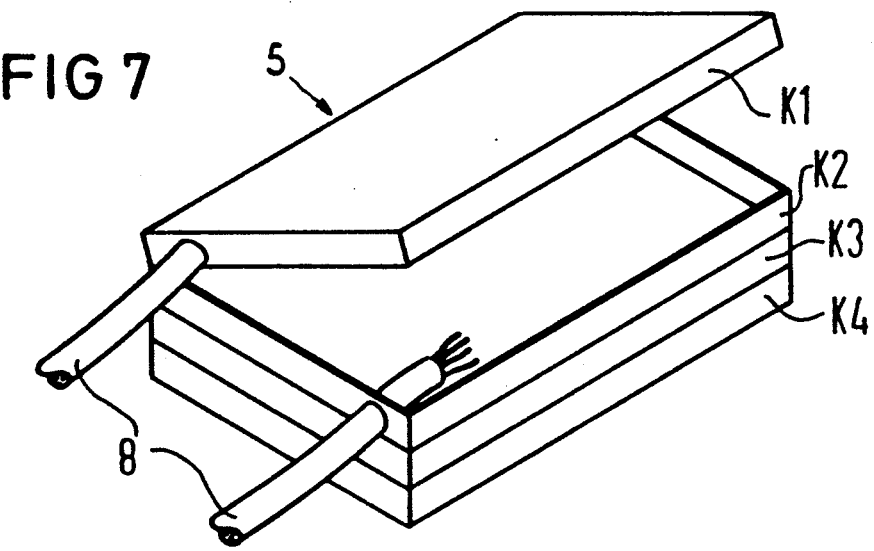
FIG. 7 is a perspective view of a cassette block.

A cassette block 5 is illustrated in FIG. 7 and is formed of four cassettes K1–K4 that accept the connecting or coupling elements and also, respectively, accept the reserve lengths of the light waveguides. Each of the cassettes K1–K4 are hingeably joined together so that they may open like pages of a book to enable quick access to an interior of each individual cassette. The structure of the cassette block of FIG. 7 is explained in greater detail in copending U.S. Ser. No. 07/836,956 filed Feb. 19, 1992, pending.

Although various minor modifications may be suggested by those versed in the art, it should be understood that we wish to embody within the scope of the patent granted hereon all such modifications as reasonably and properly come within the scope of our contribution to the art.

We claim:

1. A division rack for light waveguides comprising a cassette holder being mounted in the division rack for pivotable movement around a rotational axis at one end of the holder from a first position completely received in the division rack to a second position extending out of a front of the division rack, said holder having a plurality of holding devices for receiving cassette blocks, which comprise a plurality of cassettes, said holding device positioning the cassette blocks in the cassette holder to extend obliquely with connecting leads of the cassettes facing toward a back of the rack with the holder in the first position and with the holder in the second position, the connecting leads of the cassette being directed obliquely upwardly toward the front.

2. A division rack according to claim 1 wherein each of the holding devices is a deposit compartment formed in the cassette holder for receiving the cassette blocks.

3. A division rack for light waveguides comprising a cassette holder being mounted for pivotable movement around a rotational axis at one end of the holder from a first position completely received in the division rack to a second position extending out of the division rack, each of the cassette holders having a U-shaped profile, said holder having a plurality of holding devices for receiving cassette blocks with the cassette blocks extending obliquely in the cassette holder while in a vertical position with the terminal leads being upwardly disposed.

4. A division rack according to claim 3, wherein each of the holding devices is a deposit chamber formed in the U-shaped cassette holder by guide webs arranged along one side of said U-shaped cassette holder.

5. A division rack according to claim 4, wherein the guide webs each, respectively, include a resilient element.

6. A division rack according to claim 1 wherein the cassette holder comprises a clearance having a width of a cassette of a cassette block.

7. A division rack according to claim 1, wherein each cassette holder is mounted in a distributor housing that is received in the division rack, said distributor housing having cable clamps for terminal cables disposed under the cassette holder.

8. A division rack according to claim 7, wherein the cable clamps are arranged in graduated steps in both depth and height in the distributor housing.

9. A division rack according to claim 7, wherein a friction disc is arranged between each cassette holder and the distributor housing in the region of the rotational axis.

10. A division rack according to claim 7, which includes a stop being provided on the distributor housing to define the horizontal second position for engaging the cassette holder when it is moved to a second, horizontal position.

11. A division rack according to claim 1 which includes a stop being engaged by the cassette holder when the cassette holder is moved to the second position, said second position being a horizontal position.

12. A division rack according to claim 1, wherein each of the cassette holders comprises a U-shaped profile.

13. A division rack according to claim 12, wherein each of the holding devices is a deposit chamber formed in the U-shaped cassette holder by guide webs arranged along one side of said U-shaped cassette holder.

14. A division rack according to claim 13, wherein the guide webs each, respectively, include a resilient element.

15. A division rack according to claim 7, wherein each cassette holder has a front end opposite the one end and the connecting leads are guided from the cable clamps over the front end to the cassette blocks.

* * * * *